United States Patent
Blount

(10) Patent No.: US 6,608,184 B2
(45) Date of Patent: Aug. 19, 2003

(54) PRODUCTION OF PRODUCTS FROM SEWER SLUDGE

(76) Inventor: David H. Blount, 6728 Del Cerro Blvd., San Diego, CA (US) 92120

( * ) Notice: Subject to any disclaimer, the term of this patent is extended or adjusted under 35 U.S.C. 154(b) by 83 days.

(21) Appl. No.: 09/851,955

(22) Filed: May 10, 2001

(65) Prior Publication Data

US 2002/0185447 A1 Dec. 12, 2002

(51) Int. Cl.⁷ .............................................. C08B 37/00
(52) U.S. Cl. ...................................... 536/1.11; 536/101
(58) Field of Search ........................... 536/1.11, 1, 101; 435/7.31; 210/609, 612, 613, 631

(56) References Cited

U.S. PATENT DOCUMENTS

| | | | | |
|---|---|---|---|---|
| 4,321,360 A | * | 3/1982 | Blount | 536/128 |
| 4,650,689 A | * | 3/1987 | Hedrick | 426/600 |
| 4,952,503 A | * | 8/1990 | Granstedt | 435/161 |

* cited by examiner

Primary Examiner—James O. Wilson
Assistant Examiner—Ganapathy Krishnan

(57) ABSTRACT

Fatty oil and acids, glycerol, glycols, lactic acid, urea, fertilizer, carbohydrates, ethanol are recovered or produced from sewer sludge by the process of concentrating and filtering out the solid sewer sludge, hydrolysis of the cellulose in the sewer sludge by an alkali or acid catalyst to carbohydrates, fermentation of the carbohydrates to produce ethanol, then recover the ethanol by distillation or membrane technology. The glycerol, glycols and lactic acids are recovered by membrane technology. The polysacchride carbohydrates are hydrolyzed to monosacchrides then fermented to alcohol. The unsoluble sewer sludge and the salts such as ammonium sulfate, nitrogen containing compounds and urea from the aqueous solution left after the ethanol is distilled off are mixed, dried and utilized as fertilizer.

1 Claim, No Drawings

PRODUCTION OF PRODUCTS FROM SEWER SLUDGE

The invention concerns sewer sludge materials being recovered or the cellulose material being hydrolyzed to hemi-cellulose, carbohydrates, alcohol, glycerol, glycols, fatty oils and acids, carbon dioxide, fertilizer, etc. by a suitable economical method wherein heat, water and catalyst are recoverable and reused. This method consist of mixing the sewer sludge with a recovered aqueous catalyst or acid catalyst, then heat the mixture while agitating to evaporated off excess water from the sewer sludge filtered cake. The heat is controlled and reused by means of a heat exchange system. The dried sewer sludge contains about 20 percent inorganic materials and the rest organic materials. About 70–80 percent of the cellulose materials and other organic materials in the sewer sludge is hydrolyzed to water soluble products by catalyst and heat. The carbohydrates produced by hydrolyzing the cellulose may be crystalized out from a concentrated aqueous solution of the hydrolyzed sewer sludge. The carbohydrates maybe used as animal feed or fermented to alcohol. The polysaccharides may be further hydrolyzed to monosaccharides.

BACKGROUND OF THE INVENTION

This invention relates to an improved and an economical process to recover products and to hydrolyzed cellulose found in the sewer sludge to water soluble hemicellulose, carbohydrates, alcohol, resinous products, fatty oils and acids, glycerol, glycols and $CO_2$. There is a need to utilize the sewer sludge to produce useful product because the disposal of sewer materials have became a serious problem for cities. Other inventors have utilized acids to break down the lignin-cellulose to carbohydrates or may use an alkali metal hydroxide to separate the lignin from cellulose then using an acid such as sulfuric acid to break down the cellulose from lignin-cellulose to carbohydrates. In the improved process of this invention, the raw material is sewer cellulose material in the sewer sludge instead of lignin-cellulose materials. The solid sewer material is first concentrated by any suitable means such as precipitating, or centrifuge or coagulating the solid material to form a concentrated sewer sludge then the concentrated sewer sludge is filtering to remove excess water. There are several commercial products available to assist in coagulating or precipitating the sewer solids. The concentrated solid sewer sludge is usually in the form of a filter cake. The filter cake may be further dried in a filter cake drier to remove the desired amount of water and to sterilize the sewer sludge. This process is different from the Blount's process in U.S Pat. No. 4,321,360, because in the processes of this invention utilizes sewer sludge instead of lignin-cellulose material and also produces and recovers ethanol, glycerol, glycols, lactic acid, fatty oils and acids and fertilizer. In this process there is no need to break the lignin-cellulose bonds and remove the lignin. When the method of this invention is compared to other methods using alkali or acid catalysts, there is no need for pre-treatment, there is a utilization of much less energy for heating the reactants, uses less catalyst because there is no need to break the lignin-cellulose bond and to remove the lignin as is needed in other methods. The hydrolysis of the cellulose material in sewer sludge by means of a dilute acid such as 1–5% sulfuric acid is the most cost-effective. Hydrolysis of the cellulose maybe done with concentrated sulfuric acid and hydrochloric acid. The hydrolysis of the cellulose material by alkali catalyst may also be cost-effective when the alkali catalyst is recovered. The alkali and/or acid catalyst utilized in this process are recovered to be reused in this process. The sulfuric acid catalyst may be neutralized with ammonia and with the urea and the non-soluble sewer sludge may be utilized as fertilizer.

The carbohydrates produced by this process may be utilized to produce ethanol by fermentation, used as a food for animals and humans or utilized to produce polyols, urethane foams and other products. The carbohydrates and hemi-cellulose may be further reacted with organic epoxides, mono- and polysubstituted organic compounds, aldehydes or reacted with amino compounds and/or phenol and aldehydes, isocyanates, polyamines, polyisocyanates, mono- and polysubstituted organic compounds such as polyhalides, monohalides organic anhydrides, epihalohydrins, halohydrins and other organic compounds to produce useful resins which may be utilized as adhesives, as laminates as coating agents, as molding agents, as foams.

The pentoses and hexoses carbohydrates can be fermented but the di, tri and polysaccharides must be broken down by splitting the glycosidic bond into monosaccharides through hydrolysis. Sucrose, a disaccharide can be hydrolyzed into glucose and fructose. Futher hydrolysis can take place by adding concentrated enzymes or acids to the cellulose materials or polysaccharides.

Carbohydrates, glycerol, glycols lactic acid and alcohol are produced by reacting the following components:
  Component (a): concentrated or dried sewer sludge;
  Component (b): An alkali or acid catalyst;
  Component (c): A salt-producing compound to adjust the pH;
  Component (d): Fermentation agent;
  Component (e): Alkaline earth metal oxide or hydroxide;
  Component (f): water.

Component (a)

Any suitable sewer sludge may be utilized in this process. The sewer sludge may be in the form of a concentrated aqueous solution, filter cake or dried sewer sludge. The parts by weight are based on the weight of dry sewer sludge.

Component b)

Any suitable alkali or acid catalysts that will convert the fiber and hemi-cellulose material in the sewer sludge into a carbohydrate may be used in this invention. Alkali metal compounds, such as alkali metal oxides, alkali metal hydroxide and mixtures thereof may be utilized. Mixtures of sodium hydroxide, sodium carbonate and other sodium salts may be used. Suitable alkali metal hydroxides include sodium hydroxide, potassium hydroxide and mixtures thereof. Sodium hydroxide or sodium oxide are the preferred alkali metal compounds. The alkali metal hydroxide such as sodium hydroxide is recovered in this process as an aqueous alkali metal solution and reused.

Any suitable acid catalyst may be used in this invention. Concentrated or dilute sulfuric acid and hydrochloric acid may be utilized. Sulfuric acid is preferred. The acid catalyst may be recovered and reused. The sulfuric acid may also be reacted with ammonia and used as fertilizer. The hydrochloric acid and sodium hydroxide may be reacted to form salt and mixed with carbohydrates and feed to cattle.

Component (c)

Any suitable salt-forming compound may be used to adjust the pH of the hydrolyzed sewer material to be fermented. Acidic salt forming compound that react with the alkali catalyst and then will react with calcium oxide or hydroxide to regenerate the alkali metal oxide or hydroxide is preferred. Suitable salt-forming compounds include carbon dioxide, mineral acids, organic acid, organic acid halides, hydrogen-containing acid salts, e.g., sodium hydrogen sulfate, potassium hydrogen sulfate and, sodium dihydrogen phosphate, sulfur dioxide, sulfurous acid, acid sulfites and mixtures thereof. Carbon dioxide and mineral acids are preferred, especially sulfur oxyacids such as sulfuric acid. Any suitable basic salt forming compounds that will react with the acid catalyst maybe used to adjust the pH of the hydrolyzed sewer material to be fermented. Suitable basic salt forming compounds include but not limited to alkali metal compounds and their salts, alkaline earth metal compounds and their salts and ammonium containing compounds. Ammonia is used to adjust the pH when the remaining sewer material after fermentation is to be recovered and used as a fertilizer Component (d)

Any suitable method or fermenting agents may be used to convert the carbohydrates produced by the process of this invention to produce ethanol. Any suitable yeast which ferments a carbohydrate to produce ethanol may be added to an aqueous solution containing 10% to 40% by weight of carbohydrates produced by the process of this invention, then 5 grams of yeast per 1 to 5 gallons of the aqueous solution of carbohydrates are added. The yeast may be sprinkled on top of the solution at a temperature of 70° F.–80° F. for 12 hours, then stirred in after 12 hours. Stir extremely well and make a lot of bubbles in the mixture. Oxygen from the air helps the yeast grow. The mixture is fermented for up to 2 weeks or until the carbohydrates are used up. The ethanol is then recovered by distillation or by membrane technology. Other method may be use such as using microbial conversion or simultaneous saccharification and fermentation. There are many types of suitable yeast which are commercially available such as PREMIER CUV'EE, MONTRACHET, PASTEUR CHALMMPAGNE, COTE des BLANCS, PASTEUR RED AND LALVIN K1-V-1116 and LALVIN 71 B-1122.

COMPONENT (e)

Any suitable alkaline earth metal oxide may be used in this invention that will react with the alkali metal salt produced in this process to produce alkali metal oxide or hydroxide. Calcium oxide is the preferred alkaline earth metal oxide.

DETAILED DESCRIPTION OF THE INVENTION

The process to produce carbohydrates from a concentrated or dried sewer sludge is to mix about 100 parts by weight of dried ground particles sewer sludge with an aqueous solution containing 20 to 40 parts by weight of a alkali metal hydroxide to wet and distribute the alkali metal hydroxide through out the sewer sludge or add 20 to 40 parts by weight of an alkali metal hydroxide to the aqueous concentrated solid sewer sludge containing about 100 parts by weight of dried sewer material. The mixture is heated at ambient pressure, elevated pressure or reduced pressure to remove the excess water, sterilize the sewer sludge and breakdown the cellulose and semi-cellulose to carbohydrates. The heating is continued at a temperature of 100° C. to 240° C. while agitating for about 30–60 minutes or until the reaction becomes exothermic, then heating is stopped and cooling may be necessary. The mixture becomes a bubbling thick fluid mass. Care has to be taken so that the mixture doesn't become too hot and start burning. A heat exchange system is useful to control the temperature of the mixture and capture the heat for further use in the system. The sewer sludge is converted to a solid mixture containing some un-reacted cellulose, hemi-cellulose, , carbohydrates, urea, fatty oils and acids, glycerol, glycols, lactic acid waxes, urea and other products. Most of the cellulose material in the sewer sludge is converted to carbohydrates which are water soluble. Any suitable temperature or pressure may be used in this process to hydrolyze the cellulose material to produce carbohydrates.

About 200–500 pans by weight of water is added to the above hydrolyzed sewer sludge mixture. 70–80% of the reacted mixture is water soluble, and is filtered, decanted or centrifuged off the remaining solid sewer sludge. The remaining solid sewer sludge is re-reacted with the next batch of sewer sludge or utilized as fertilizer or burned for heat.

The pH of the aqueous solution containing the carbohydrate, fatty oils and acids, glycerol, glycols, lactic acid, cellulose resinous products, catalyst and salt is adjusted with a acidic or basic salt forming compound to a pH of 3 to 7 or to the pH recommended for the fermentation process. The cellulose resinous products, fatty oils and acids and other organic compounds floats to the top of the aqueous solution and is skimmed off. Any suitable acidic or basic salt forming compound may be used to adjust the pH, but carbon dioxide and/or a sulfur oxyacid, such as sulfuric acid, is preferred, except when the material after fermentation is to be used for fertilizer then ammonia is used.

The aqueous solution containing the carbohydrates maybe fermented to produce ethanol. The carbohydrates may also be crystalized out of the solution by evaporating off most of the water, under any suitable method, such as heating under reduced pressure. The carbohydrates, glycerol, lactic acid and glycols may also be separated from the salts by the technology of membrane filtration. The carbohydrates are allowed to crystallize out of the aqueous solution, and recovered by filtration or decantation. The aqueous solution still contains soluble carbohydrates and salt, and maybe reconcentrate and more carbohydrates will crystalize out. The waxes, resinous products and fatty oils and acids may be skimmed off the top of the solution. The carbohydrate and salt (NaCl when HCl is used) solution may be evaporated to a concentrated solution or solid, then mixed with cattle feed and used to feed cattle, horses, sheep, goats, rabbits, etc. The carbohydrates may be separated from the salt by crystalizing out the carbohydrates or by membrane technology and used for food. The carbohydrates may also be reacted with organic epoxides to produce polyols which are used in the production of rigid polyurethane foams and resinous products. The aqueous solution of the carbohydrates and urea may be reacted with polyisocyanates to produce polyurethane foams.

The aqueous carbohydrate and salt solution and/or the carbohydrate crystal in water may be fermented by any suitable means, such as with yeast, to produce ethanol. There are many types of yeast that are used to ferment the carbohydrates of this invention and are commercially available. The carbohydrates may be converted to a more desirable carbohydrate by enzymes. Genetically engineered strains of *E. coli* maybe used to convert the carbohydrates to ethanol. The ethanol is removed from the aqueous solution by evaporation or by membrane filtration technology.

The aqueous solution containing salt is heated to evaporate the water from the salt by any suitable means or may be separated by using a membrane technology. The water is recovered and reused. The salt is mainly sodium carbonate and sodium-acidic salt forming compound, such as carbonate, sodium acetate or sodium sulfate. An alkaline earth metal oxide such as calcium oxide is added and mixed with the salt in an amount about equal to the mols or greater than the mols of the salt present then reacted to recover the alkali metal hydroxide. The mixture is heated in a recovery furnace until the organic matter is burned then the alkali metal salts are recovered. The aqueous alkali metal salts are reacted with alkaline earth metal oxide to recovery the alkali metal hydroxides.

The object of this invention is to produce carbohydrates, glycols, glycerol, lactic acid, urea, fertilizer, ethanol and other extracts from the sewer sludge. Another object is to produce carbohydrates which may be used for food, in the production of ethanol and as the intermediate in the production of other useful organic polymers such as polyols, polyurethane foam, epoxides and other products.

The sewer sludge is hydrolyzed using an alkali or acid catalyst into useful products such as cellulose, hemi-cellulose, carbohydrates, fatty acids and oils, glycerol, glycols lactic acid and alcohol by the following steps:

1. Preparation of Sewer Sludge:

Sewer sludge is recovered from the sewer material by precipitating, centrifuge or coagulating the solid particles then filtering out the solid particle in the form of a wet filter cake. The sewer sludge filter cake may be used as is or may be partially dried or completely dried in a filter cake drier. The sewer sludge filter cake is placed in a digester or heating vessel in the amount of about 100 parts by weight, parts by weight based on weight of dry sewer sludge.

2. Adding Alkali or Acid Catalyst:

An alkali catalyst is utilized by adding an aqueous solution of an alkali metal hydroxide containing 20 to 40 parts by weight of alkali metal hydroxide is added to 100 parts by weight of the dried sewer sludge while being agitated or 20 to 40 parts by weight of alkali hydroxide is add to the concentrated sewer sludge solids containing about 100 parts by weight of dried sewer sludge.

When an acid catalyst is utilized in a concentrated sewer sludge solids, a dilute sulfuric acid is utilized. The sulfuric acid is utilized in the amount of 1% to 5%. Concentrated sulfuric acid or hydrochloric acid is utilized as the catalyst with dried sewer sludge.

3. Converting Sewer Sludge:

The mixture containing the alkali catalyst is heated to above the boiling point of water to evaporate off excess water and to sterilize the sewer sludge, then the heating continues under ambient pressure or elevated pressure and continues until the mixture is heated to about 140°–200° C. or until the mixture begins to bubble and liquify. The heating is stopped and the reaction is exothermic. The temperature is controlled by an heat exchanger to prevent the sewer sludge from catching on fire. A small amount of carbon dioxide and ammonia are produced in this reaction. Some of the carbon dioxide reacts with the sodium hydroxide and some escape. Thereby producing a solid mixture of some cellulose, hemi-cellulose, fatty oils and acids, glycols, glycerol, lactic acid, waxes, urea, inorganic compounds and carbohydrates.

When a dilute sulfuric acid catalyst is utilized with the concentrated sewer sludge solids the mixture is heated to 100° to 240° at ambient or elevated pressure for various length of time until the cellulose materials has been hydrolyzed. When concentrate sulfuric acid or hydrochloric acid is used as the catalyst with dried sewer sludge, it is carried out at a lower temperature such as 30° C. to 100° C. at ambient or elevate pressure.

4. Dissolving Reacted Sewer Sludge:

About 300–400 parts by weight of water is added to the said solid mixture to dissolved the water soluble material containing, fatty oils and acids, glycols, glycerol,waxes, urea, inorganic and other organic materials and carbohydrates. The water soluble material is centrifuges and filtered or decanted from the unsoluble sewer sludge material. The unsoluble sewer sludge is re-washed and water soluble material is filtered off. The unsoluble sewer sludge may be used as fertilizer.

5. Adjusting pH:

An acidic or alkali salt forming compound is added to the aqueous mixture of the water soluble material until the pH is 3–7 or to the pH required for the yeast to function proper.

6. Separating Components:

The organic material that floats to the top is skimmed of. The water soluble carbohydrates and salts are separated by decanting or centrifuge and filtering off the non-water soluble materials precipitated by the acid or alkali compound. Fermentation may take place following this step if desired. The carbohydrates may be separated from the salt by membrane technology. When fermentation takes place at this stage the alcohol is recovered by distillation or by membrane separation. The remaining aqueous material with the alkali catalyst is processed to reclaim the alkali hydroxide. When a dilute sulfuric acid catalyst is used the solution could be neutralized with ammonia and the remaining material utilized as a fertilizer containing ammonium sulfate, urea and other nitrogen products.

7. Crystalizing Carbohydrates:

Water is evaporated from the carbohydrates, salt and other products by any suitable means until a concentrated solution is obtained. The carbohydrates crystalize out of the concentrated solution, and the aqueous solution containing the salts and other products is filtered or decanted off the crystals. The aqueous alkali salts are to be reconverted to sodium hydroxide.

8. Fermentation:

Water is added to the carbohydrate crystals to form an aqueous solution containing 15–40% carbohydrates. The aqueous solution of carbohydrates are fermented by yeast and ethanol and carbon dioxide are produced. The ethanol is evaporated from the aqueous solution by any suitable means and the water is re-used. The carbon dioxide may be collected. Genetically engineered strains of *E-coli* may be used to hydrolyze the carbohydrates to ethanol.

9. Recovering Ethanol:

Ethanol is evaporated from the water by any suitable means such as heating under reduced pressure or by membrane technology. The alcohol is dehydrated by azeotropic distillation.

10. Recausticizing:

The aqueous salts are heated and most of the water and volatile organic compounds are evaporated off or separated by membrane technology, then it is add to a recovery furnace/boiler if desired. The solid or molted salts is dissolved in water and reacted with an alkaline earth metal oxide such as lime. The alkaline earth oxide react with the alkali metal carbonate and alkali metal acid salt to produce alkali metal hydroxide and alkaline earth metal salt which is insoluble. The alkali metal hydroxide is decanted or filtered off and reused in this process.

11. Alkaline Earth Metal Recovery:

The insoluble alkaline earth metal is heated in the lime kiln and converted back to alkaline earth metal oxide to be reused in this process. The carbon dioxide may be captures, purified and stored for use in the process.

Fermentation may take place at different steps of this process such as in steps 6 before the salt is removed and in step 8. Membrane filtration may be utilized in a number of different steps of this process. Membrane filtration systems are source selective molecular size or molecular weight. Molecules of different weight and sizes are stopped and concentrated. Membrane filtration used in the saccharification stage, byproduct recovery stage and fermentation stage to retain enzymes, carbohydrates, salts, yeast and allows water and ethanol to penetrate the membrane. By trapping the yeast, fermentation can proceed continuously at a fraction of the conventional time of 40–50 hours. The membrane filtration technology can be deployed to recover byproducts such as glycerol, glycol, lactic acid, urea and others. It also reduces the amount of solids going to the evaporator. This technology reduces the cost and increases the revenue.

Evaporation of the water may take place by any suitable means to conserve energy, such as by heating at ambient pressure, increased pressure or lower than ambient pressure or by a multiple-effect evaporators which is preferred. The multiple-effect evaporators remove the bulk of the water by operating in series while at different pressures. Therefore the vapor from one evaporator body can be the steam supply for the next unit. In this approach the original feed steam performs the final concentration and the vapor becomes the steam for the next less-concentrated evaporator. Heat can also be supplied to the evaporator from the digester's heat which is recovered by a heat exchange.

The recovery boiler is utilized to evaporate the residual moisture from the aqueous salt material, then burn the unsoluble organic material to supply heat for steam generation, to recover inorganic chemical in solid or molten form and conditioning the products of combustion for minimal chemical carryover. The solid or molten inorganic salts flows into the dissolving tank to be filtered and recausticizing by the addition of alkaline earth metal oxide such as lime to react with the carbon dioxide radical and acid radical thereby producing sodium hydroxide. The lime mud is precipitated and the aqueous sodium hydroxide is filtered or decanted off and reused. The lime mud is re-burned to form CaO and carbon dioxide may be recovered.

Fatty acids and oils, waxes and cellulose resinous products usually floats to the top of the aqueous salt solution during processing and is skimmed off and processed else where. It is used in soaps and paper sizing.

DESCRIPTION OF PREFERRED EMBODIMENTS

My invention will be illustrated in detail by the specific examples which follow, it being understood that these preferred embodiments are illustrative of, but not limited to, procedures which may be used in the production of glycol, glycerol, waxes, fatty acids and oils, lactic acid, fertilizer, carbohydrates and ethanol. Parts and percentages are by weight unless otherwise indicated.

EXAMPLE 1

About 100 parts by weight of aqueous sodium hydroxide containing 20 part by weight of sodium hydroxide and 100 parts by weight of a dry sewer sludge are mixed, then heated to above the boiling point of water at ambient or elevated pressure to remove excess water, then continue to heat to about 140° to 200° C., while agitating at ambient pressure, with care being taken that the mixture does not burn, for 5 to 60 minutes or until the mixture softens and expands into a dark-brown, bubbling thick paste. It cools to a solid mixture containing a little cellulose, hemicellulose, carbohydrates, glycerol, glycols, lactic acid, resinous products, urea and fatty oils and acids. About 400 parts by weight of water is added to the solid mixture and the water soluble portion dissolves. About 10–20 parts by weight of the sewer sludge is not dissolved in the water.

Dilute sulfuric acid is added until the pH is 5 to 6.5 while agitating thereby producing some dark-brown cellulose resinous products, waxes and fatty acids and oils, which floats to the top, an aqueous solution of carbohydrates, glycerol, glycols, lactic acid, urea, salt and other products. The organic resinous product, waxes and fatty acids and oils are recovered by skimming it off. The aqueous solution is recovered by decanting or filtering. The aqueous solution of carbohydrates, other products and salts is heated under reduced pressure to form a concentrated solution. After a several hours the carbohydrates crystalize out. The aqueous solution containing the salt and other products is filtered off and the carbohydrate crystals are recovered.

EXAMPLE 2

Example 1 is modified wherein the carbohydrate crystals are added to water to make an aqueous solution containing 25% carbohydrates. A yeast, saccharomyces bayanus, in the amount of 3 grams, is add to 40 ml of warm water and remained on top for 15 minutes, then stirred well to suspend the yeast in the water. This yeast was added to the aqueous carbohydrate solution and kept at about 70° F. The solution was stirred daily for 5–6 days or until the hydrometer gives a specific gravity reading of 1.040 then poured into a sterile container with and adapter and an airlock. The gases from the fermentation process escape through the airlock. The solution was left to stand for 1 weeks. The alcohol was distilled off. The alcohol was dehydrated by azeotropic distillation. The carbon dioxide produced may be collected.

EXAMPLE 3

Example 2 was modified wherein the aqueous carbohydrate and salt mixture produced in example 1 is used in place of the aqueous carbohydrate crystals solution.

EXAMPLE 4

Example 1 is modified wherein the carbohydrates are separated from the aqueous salt solution by membrane technology instead of crystalizing the carbohydrates.

EXAMPLE 5

About 100 parts by weight of sewer sludge in the form of a filter cake of sewer sludge, weight based on the weight of dry sewer sludge, and 25 parts by weight of sodium hydroxide are added to the filter cake of sewer sludge while agitating. The mixture is heated to above the boiling point of water until the water has been evaporate and the cellulose is converted to carbohydrates. When the mixture starts to expand heating is stopped. The solidified mixture contains some cellulose, inorganic materials, fatty oil, urea, waxes and other organic materials, but mostly carbohydrates. Water is added to the solidified mixture while agitating and most of the mixture is soluble in water. The aqueous solution is filtered off, then hydrochloric acid is added while agitating until the pH is 5 to 7. The aqueous solution of carbohydrates, salt and other organic products is heated under reduced pressure to evaporate off water until the solution is concentrated. The solution is mixed with cattle feed and feed to cattle.

EXAMPLE 6

Example 5 is modified wherein carbohydrates are separated from the aqueous salt solution by means of membrane technology. The aqueous solution of carbohydrates are converted to ethanol by utilizing a yeast by adding about 3 gms yeast to 50 cc of the warm then let it set for 15 minutes then mix well. The yeast mixture is added to the 2 gallons of aqueous carbohydrate solution containing 20–30% carbohydrates then agitated. The solution was stirred daily for 1 week. The carbohydrates were fermented into ethanol. The yeast is selected from the list below:

A) Premier Cuv'ee
B) Montrachet
C) Pasteur Champage
D) Cote des Blances
E) Pasteur Red
F) Lalvin 71 B-1122
G) Lalvin K1-V-1116
H) Lalvin EC-1118

EXAMPLE 7

Example 6 is modified wherein an genetically engineered strain of *E. Coli* was used in place of the yeast to convert the carbohydrates in to ethanol. The ethanol was evaporated from the water under reduced pressure.

EXAMPLE 8

About 100 parts by weight of sewer sludge, based on the weight of dry sewer sludge, in the form of the filter cake of sewer sludge which contains water and concentrated sulfuric acid in an amount sufficient to produce a solution containing 5% sulfuric acid, percentage based on the weight of the dry sewer sludge. The mixture is heated to above 70° C. for at least 30 minutes to kill any pathogenic bacteria or virus then the temperature is elevated up to 240° C. for 30 minutes under pressure or until most of the sewer sludge becomes water soluble.

The aqueous solution is filtered to remove any insoluble sewer sludge. An aqueous solution of sodium hydroxide is mixed with the aqueous carbohydrate solution until the pH is 5 to 6.5. The cellulose resinous products waxes and fatty acids and oils are skimmed from the top. The aqueous solution of carbohydrate, salt, and other organic compounds is heated at reduced pressure to evaporate water to concentrate the solution, then the carbohydrates are allowed to crystalized out. The aqueous solution is filtered off to recover the carbohydrates.

EXAMPLE 9

Example 8 is modified wherein the aqueous carbohydrate and salt solution is fermented by yeast to produce ethanol. The ethanol is recovered from the aqueous solution by distillation.

EXAMPLE 10

About 100 parts by weight of an aqueous sodium hydroxide containing 30 parts by weight of sodium hydroxide is mixed with 80 parts by weight of dry sewer sludge. The mixture is heated until the water is evaporated then heated to 150° to 200° C. while agitating at ambient pressure for 5 to 60 minutes or until the sewer sludge begins to swell and bubble. Heating is stopped. The reacted sewer sludge cools into a solid mass. 150 parts by weight of water is added and mixed with the solid mass thereby producing an aqueous solution of carbohydrates, sodium hydroxide, sodium carbonate, waxes, fatty acids and oils, glycerol, glycols, lactic acid, cellulose resinous products, urea and other organic compounds. Dilute sulfuric acid is added to the aqueous solution while agitating, until the pH is 5 to 6.5. The waxes, fatty acids and oils and cellulose resinous products are skimmed of the top. The aqueous solution is heated under decreased pressure until the solution is concentrated. The carbohydrates are allowed to crystalize out, then the salt water is filtered off.

EXAMPLE 11

10 parts by weight concentrated sulfuric acid is added to a filter cake of sewer sludge which contains 50 parts by weight dry sewer sludge then mixed and allowed to react for 1 hour at ambient temperature and pressure. 100 parts by weight of water is add to the reacted sewer sludge to produce an aqueous solution containing carbohydrates, urea sulfate, sulfuric acid, glycols, glycerol, fatty oils and acid, cellulose resinous products, other organic compounds and inorganic compounds. The non-water soluble sewer sludge is removed by filtration. The salts and carbohydrates, glycols, glycerol and lactic acid are separated by a membrane technology. The aqueous solution containing 20 to 30% carbohydrate was fermented to produce ethanol and carbon dioxide. The ethanol was recovered by membrane technology. Then dehydrated by azeotropic distillation. The carbon dioxide may be collected.

The aqueous solution contain the sulfuric acid and salts are heated to evaporate water in or to produce a concentrated sulfuric acid solution then filtered and reused.

EXAMPLE 12

Example 1 is modified wherein 10 parts by weight of the hydrolyzed solid sewer sludge consisting of resinous products, carbohydrate, fatty oils and acids, urea other organic compounds and sodium hydroxide, sodium carbonate and other inorganic compounds is powdered, mixed and reacted with 5 parts by weight of epichlorohydrin thereby producing an polyepoxy resin. Other epihalohydrin compounds may be used in place of epichlorohydrin such as, epifluorohydrin and epibromohydrin.

EXAMPLE 13

Example 1 is modified wherein 10 parts by weight of the aqueous solution of the carbohydrates, fatty acids and oils, resinous products, urea and sodium carbonate, containing 50% water, 0.1 part by weight of silicone surfactant, 0.05 parts by weight of dimethyolamine and 15 parts by weight of polymeric MDI are added and mixed, the mixture expands, hardens and produces a rigid polyurethane foam.

EXAMPLE 14

Example 1 is modified wherein 10 parts by weight of the carbohydrate crystals, 2 parts by weight of water, 0.5 part by weight of phosphoric acid and 5 parts by weight propylene oxide are mixed and reacted thereby producing a polyol.

EXAMPLE 15

Example 1 is modified wherein the aqueous solution of cellulose resinous products, hemi-cellulose, fatty oils and acids, carbohydrates, glycerol, glycol, urea other organic compounds, sodium hydroxide, sodium carbonate and inorganic compounds is reacted with an organic compounds to produce resinous products. The organic compounds are selected from aldehydes, mono-or poly halogenated organic compounds, isocyanates, polyisocyanates, amino compounds, amines, polyamines, polyamines epoxides, polyepoxides, epichlorohydrins, aminoplasts, phenoplasts and mixtures thereof.

EXAMPLE 16

Example 8 is modified when in ammonia is used to adjust the pH of the hydrolyzed sewer sludge, the carbohydrate is fermented into ethanol and distilled off. The remaining aqueous solution containing ammonium sulfate, other organic and inorganic compounds, urea and other nitrogen containing compounds are mixed with the filtered out solid sewer sludge and utilized as fertilizer.

EXAMPLE 16

Sulfuric acid is added to a concentrated solution of sewer sludge containing about 100 parts by weight of dry sewer sludge to obtain a 4% concentration of sulfuric acid in the sewer sludge. The mixture is heated to about 150° under 20 psi for 1 hour. The mixture is diluted with water until it contains about 30% of the hydrolyzed sewer sludge. The solution is then centrifuged and filtered to removed the unsoluble materials which are used as fertilizer. Aqueous ammonia is added to the solution until the pH is about 6. Yeast us added the carbohydrate solution and the carbohydrates are fermented to ethanol. The ethanol is recovered by distillation.

EXAMPLE 17

Example 16 is modified wherein the filtered hydrolyzed sewer sludge containing carbohydrates, salts, other organic and inorganic compounds is heated under reduced pressure to remove water and to form a concentrated carbohydrate solution. The carbohydrates slowly crystalize out, then the water containing salt, urea and other organic compounds is decanted off thereby recovering the carbohydrates. The aqueous solution containing salt, urea and other nitrogen compounds and other organic and inorganic compounds is neutralized with ammonium hydroxide and utilized as fertilizer.

EXAMPLE 18

Example 17 is modified wherein the crystalized carbohydrates are dissolved in water to produce a solution containing 20% carbohydrates. Yeast is added and the carbohydrates are fermented to produce ethyl alcohol. The ethanol is recovered by distillation.

EXAMPLE 19

Example 18 is modified wherein the carbohydrates did not under go fermentation are further hydrolyzed to monosaccharides by adding sulfuric acid and heating the mixture at 100° C. for about 1 hr. or until the carbohydrates are hydrolyzed to a monosaccharide then the pH is adjusted by addition of sodium carbonate to a pH of 5.5, then fermented by yeast to ethanol. The ethanol is recovered by distillation.

Although specific materials and conditions were set forth in the above examples, these were merely illustrative of preferred embodiments of my invention. Various other compositions, such as the typical materials listed above, may be used where suitable. The reactive mixtures and products of my invention may have other agents added thereto in order to enhance or otherwise modify the reaction and products. Other modifications of my invention will occur to those skilled in the art upon reading my disclosure. These are intended to be included within the scope of my invention, as defined in the appended claims.

I claim:

1. The process for producing carbohydrates from dry sewer sludge by the process consisting of mixing, heating and reacting by the following steps:
   (1) dried sewer sludge is ground into small particles;
   (2) aqueous sodium hydroxide is added to and mixed with the sewer sludge;
   (3) sewer sludge is heated to remove excess water;
   (4) sewer sludge is heated to 100° to 240° C. for 5 to 60 minutes;
   (5) water is added and mixed to form an aqueous solution;
   (6) carbon dioxide is added and mixed with the aqueous solution to react with the sodium hydroxide to form sodium carbonate;
   (7) carbohydrates form crystals and the aqueous solution is filtered off thereby recovering the carbohydrates;
   (8) lime oxide is added and reacted with the aqueous solution of sodium carbonate to form sodium hydroxide and calcium carbonate which precipitates, and the aqueous sodium hydroxide is decanted off to be reused;
   (9) calcium carbonate is heated in a lime kiln to recover calcium oxide for reuse and the carbon dioxide is collect for reuse.

* * * * *